Dec. 26, 1922.
C. R. LAW.
CONVEYER CHAIN CLEAT.
FILED JAN. 24, 1922.
1,439,967.
2 SHEETS—SHEET 1.
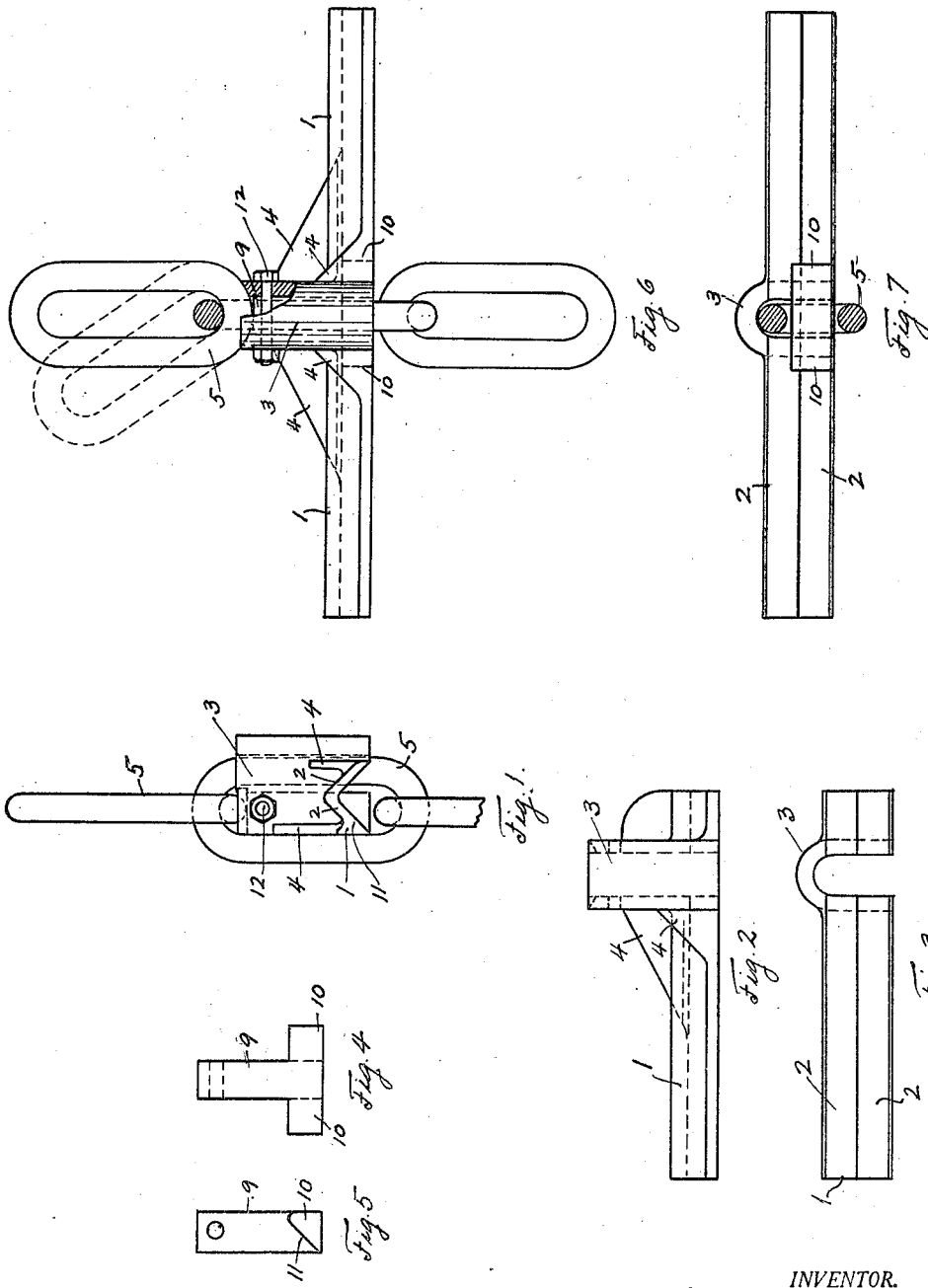
INVENTOR.
Charles R. Law
BY
Hardway Cathy
ATTORNEYS

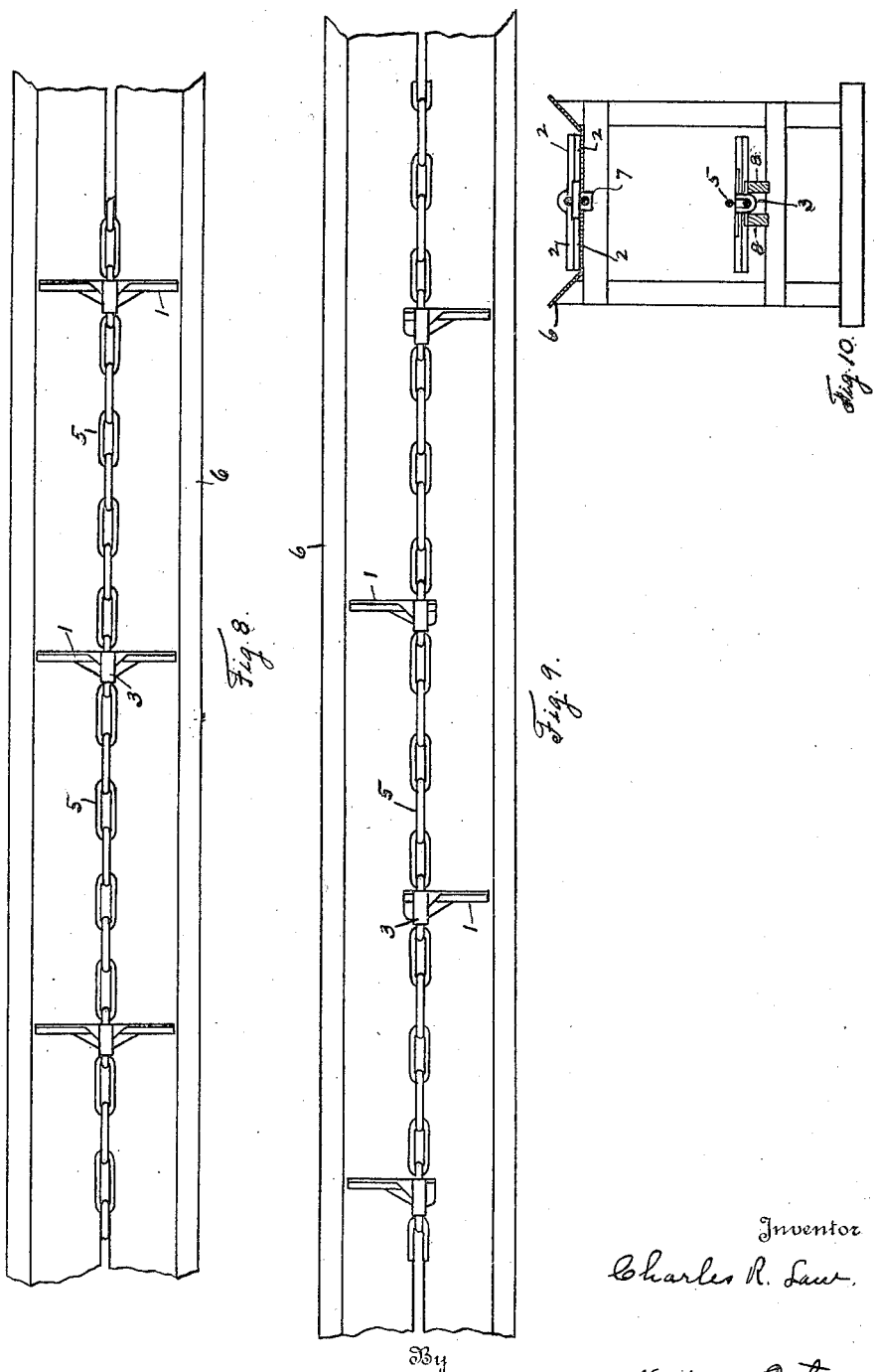

Patented Dec. 26, 1922.

1,439,967

UNITED STATES PATENT OFFICE.

CHARLES R. LAW, OF MANSFIELD, LOUISIANA.

CONVEYER-CHAIN CLEAT.

Application filed January 24, 1922. Serial No. 531,457.

*To all whom it may concern:*

Be it known that I, CHARLES R. LAW, citizen of the United States, residing at Mansfield, in the parish of De Soto and State of Louisiana, have invented certain new and useful Improvements in a Conveyer-Chain Cleat, of which the following is a specification.

This invention relates to new and useful improvements in a conveyer-chain cleat.

One object of the invention is to provide a cleat for conveyer-chains which is used primarily for the purpose of dragging material, such as slabs, sawdust or shavings, through a conveyer-chute.

Another object of the invention is to provide a cleat which may be quickly and easily attached to the chain so that broken cleats are easily and quickly replaced and the conveyer thus easily kept in repair.

Another object of the invention is to provide a cleat which may be securely attached to the chain and is not liable to become accidentally released therefrom.

A still further feature of the invention resides in the provision of a conveyer-chain cleat which is light and of simple construction so that it may be cheaply and easily manufactured and which at the same time is strong and durable.

With the above and other objects in view the invention has particular relation to certain novel features of construction, arrangement of parts and use, an example of which is given in this specification and illustrated in the accompanying drawings, wherein:

Figure 1 shows an end view of the cleat attached to a conveyer-chain.

Figure 2 shows a top plan view thereof.

Figure 3 shows a front view.

Figure 4 shows an inside view of the key block employed.

Figure 5 shows a side view thereof.

Figures 6 and 7 show top plan and front views respectively of the double cleat.

Figures 8 and 9 show plan views of the conveyer chutes showing the conveyer-chain equipped with double and single cleats respectively, the latter being alternately arranged and, Figure 10 shows a transverse sectional view of the conveyer.

Referring now more particularly to the drawings, wherein like numerals of reference designate similar parts in each of the figures, the numeral 1 designates the body of the cleat. As illustrated in Figures 1, 2 and 3, this body is angular, a cross sectional view thereon presenting wings 2, 2 at right angles to each other. At one end the cleat is widened and thickened forming a shank 3 and integral with said shank and the respective wings 2 are the reinforcing webs 4, 4. The arched formation of the cleat thus reinforced produces a very strong and durable structure.

The conveyer-chain is formed of the ordinary links 5 and this chain is mounted in the usual way to run in the chute 6, this type of conveyer is used principally for the purpose of carrying away the slabs, sawdust and shavings from saw mills. The cleats run along the floor of the chute and this floor is provided with a central longitudinal groove 7 to receive the chain links. In the preferred form of conveyer cleats are alternately arranged as shown in Figure 9, but the cleats may be formed double as shown in Figure 8. The conveyer-chain returns underneath the chute and rides on the track formed of the timbers 8, 8 which are spaced apart.

The shank 3, in plan, presents a U shaped form to form a bearing which receives the side of the link to which it is attached. This bearing is closed by means of the key block 9 which is inserted inside of the link and whose forward end is formed with the laterally extending wings 10, 10 formed with a sloping face 11 which forms a bearing against the forward side of the adjacent wing 2. This key block is bolted in place by means of a suitable bolt 12. The cleat is thus securely locked to the link of the chain.

The cleat may be easily applied to the link by first inserting the key block in position within the link and then engaging the U shaped shank over the wings 10 and then inserting the bolt into position. The wings 10 interlock with said bearing to secure one end to the key block in place and the other end of said block is held in place by the bolt 12.

By removing said bolt the cleat may be readily removed from the chain in an obvious manner.

As before stated the chain in the chute travels along the groove 7 which holds it centered. In returning the chain traveling underneath the chute has considerable slack and the thickened shank 3 rides between the timbers 8, 8 to hold the returning chain steady and to prevent the side slapping thereof.

What I claim is:

1. A conveyer cleat, which is formed with an open bearing to receive one side of a link, the closed end of said bearing projecting beyond the plane of the adjacent side of the cleat, and a key-block formed to fit into the bearing to secure the same on the link.

2. A conveyer cleat, a section of which is formed with a U-shaped bearing to receive one side of a link, a key block one end of which is formed with wings which interlock with said bearing, and means for detachably securing the other end of said block in said bearing.

3. A conveyer cleat formed with angularly disposed wings and at one end thickened and formed with a bearing to receive one side of a chain link, a key block formed to fit into the open end of said bearing and one of which interlocks with the bearing, and means for detachably securing the other end of said block in the bearing.

4. A conveyer cleat formed with angularly disposed wings, and whose forward side is concaved, said cleat having a thickened shank formed into a U-shaped bearing whose closed end projects beyond the plane of the adjacent side of the cleat, a key block formed to fit within, and close the open ends of the bearing.

5. A conveyer cleat formed with angularly disposed wings, and whose forward side is concaved, said cleat having a thickened shank formed into a U-shaped bearing whose closed end projects beyond the plane of the adjacent side of the cleat, a key block formed to fit within, and close, the open end of the bearing, one end of said block being formed to interlock with the bearing, and a bolt securing the other end of the block in the bearing.

6. A conveyer cleat one end of which has a U-shaped bearing to receive one side of a link, the closed end of said bearing projecting beyond the plane of the adjacent side of the cleat, a key block formed to fit into the open end of the bearing and means securing said block in said bearing.

7. A conveyer cleat formed with a U-shaped bearing to receive one side of a chain link, the closed end of said bearing projecting beyond the plane of the adjacent side of the cleat, a key block formed to fit into the open end of said bearing, and means for securing said block in said bearing.

In testimony whereof I have signed my name to this specification in the presence of two subscribing witnesses.

CHARLES R. LAW.

Witnesses:
J. W. PARSONS,
L. V. WARREN.